Sept. 21, 1965 A. G. MAKOWSKI 3,207,822
METHOD OF DECORATING PLASTIC OBJECTS
Filed Aug. 6, 1962 3 Sheets-Sheet 2
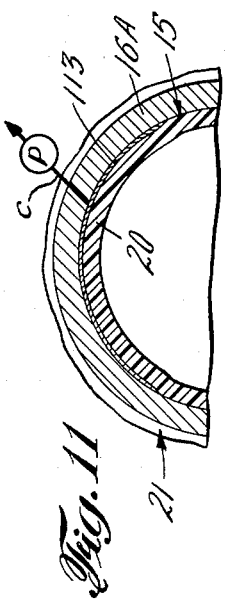
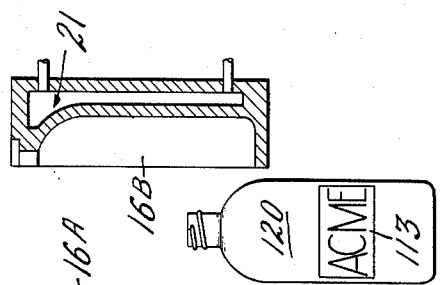
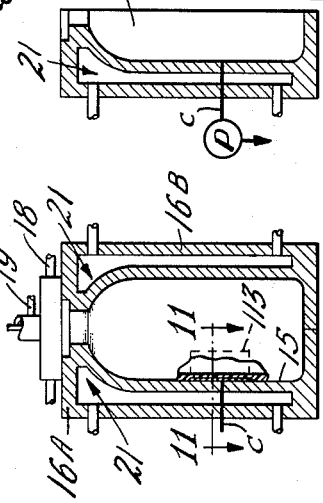
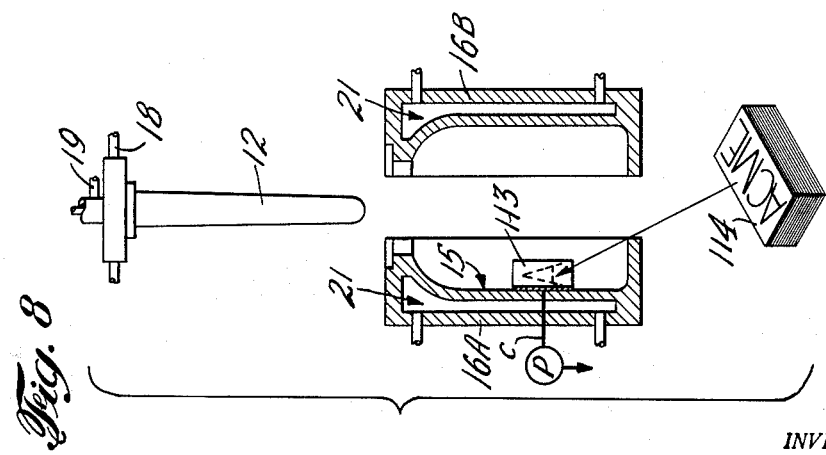
INVENTOR.
ALEXANDER GEORGE MAKOWSKI
BY
ATTORNEYS Sept. 21, 1965  A. G. MAKOWSKI  3,207,822
METHOD OF DECORATING PLASTIC OBJECTS
Filed Aug. 6, 1962  3 Sheets-Sheet 3
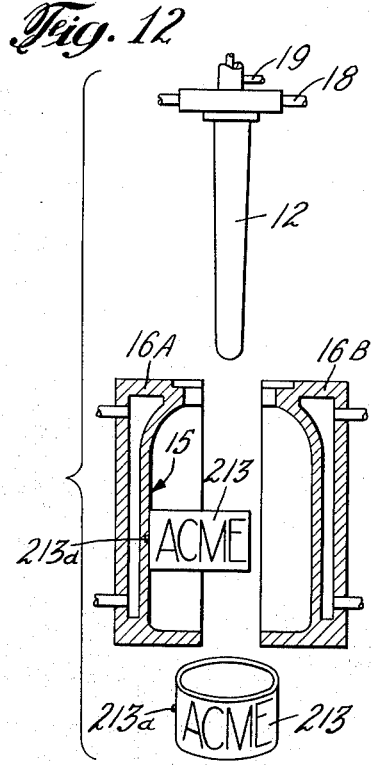
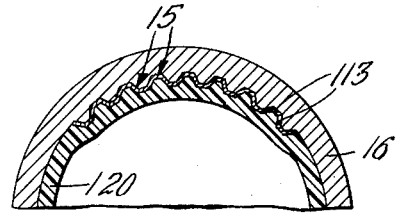
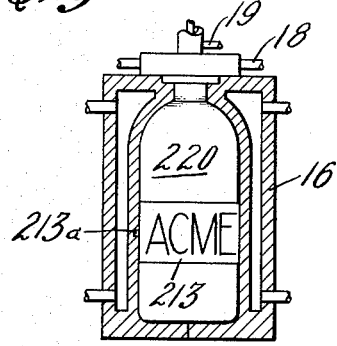
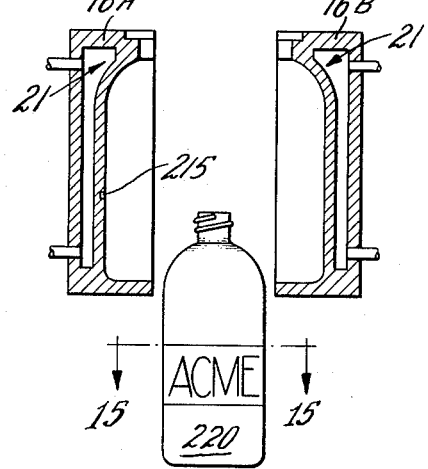
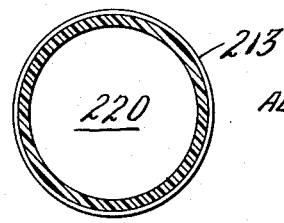
INVENTOR.
ALEXANDER GEORGE MAKOWSKI
BY Bertram F. Claeboe
George W. Reiber
ATTORNEYS

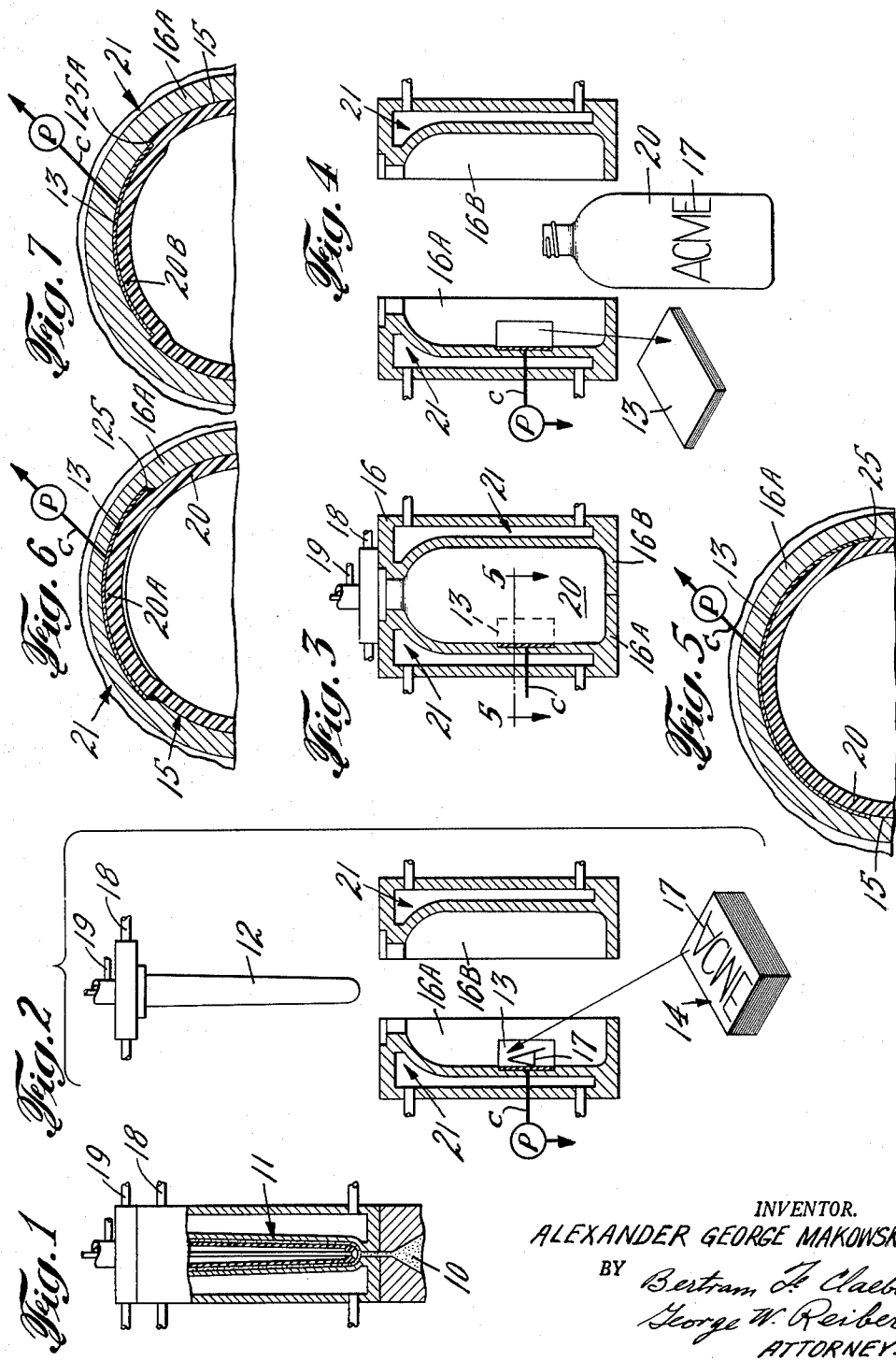

United States Patent Office

3,207,822
Patented Sept. 21, 1965

1

3,207,822
METHOD OF DECORATING PLASTIC OBJECTS
Alexander George Makowski, Berwyn, Pa., assignor to American Can Company, New York, N.Y., a corporation of New Jersey
Filed Aug. 6, 1962, Ser. No. 215,096
3 Claims. (Cl. 264—94)

This application is a continuation-in-part of my application Serial No. 21,807 filed April 12, 1960, now having a forfeited status.

The present invention relates in general to the process of manufacturing a solidified object of a desired size and shape and with indicia on the surface thereof, and more particularly to a process of manufacturing a polyethylene container or bottle wherein indica is fixed on the surface simultaneously with and while the bottle is blown from a parison.

Various processes have been used in the past for manufacturing bottles and applying labels, indicia, or printed matter to the surfaces thereof for indicating the contents or other relevant pertinent data. In one of these prior methods polyethylene was first formed into a parison. In a following step of the process the parison was enlarged into a bottle by placing it in a bottle-forming mold and either drawing a vacuum on the outside of the parison or forcing gas or air under pressure into the inside of the parison to expand the material against the mold. When the formed bottle, clear and free of all indicia and printing, solidified it was removed from the mold.

At a later time, and as an operation completely separate from forming the bottle, the completed bottle was placed in a separate mold which protected the size and shape of the bottle while the indicia was fixed, as by printing, on the surface thereof. In one instance printed matter was transferred or fixed to the surface of the bottle by heating that portion of the surface of the bottle on which the printed matter was to be placed and at the same time keeping the remainder of the bottle cool.

The prior art also teaches other methods wherein the bottle first was completely finished clear of all printed matter or indicia. Thereafter and as a separate operation, the bottle was subjected momentarily to ozone, gas flames, corona discharge or a chemical agent, followed by fixing the indicia on the surface thereof by printing wherein ink which would adhere to the thus treated polyethylene was used.

It is readily apparent that in each of these prior methods a spearate operation was required for fixing the indicia on the bottle, and means had to be provided prior thereto to treat the bottle so as to render its surface capable of receiving and thereafter retaining the indicia.

Another problem encountered with polyethylene containers or bottles relates to the static properties of the material. Unless polyethylene is treated to eliminate its static attraction for dust, it will draw dust from the surrounding air. It is well recognized that this attraction of dust and any dust covering display or indicia on the bottle would tend to disfigure it. Therefore, the common procedure has been to pass completed bottles through a suitable bath such as a detergent solution so that the bottles will be anti-static and not attract dust. It has been noticed that if the bottles were thus treated prior to the placing of indicia on the surface thereof the indicia could not be permanently fixed to the surface.

On the other hand, if the indicia were placed on the surface prior to the anti-static treatment, the indicia may be damaged or destroyed thereby. This is particularly true in those instances wherein the indicia is in the form of paper labels adapted to be adhered or glued to the surface of the bottle. If the label is bonded to the bottle or fixed to it prior to the anti-static treatment it would be permanently bonded or fixed to the bottle but would be damaged by the cleaning. On the other hand, attempts to affix the label after the anti-static cleaning were unsuccessful because the label would not adhere to the bottle.

One of the main objects of the present invention is to overcome the aforementioned deficiencies and problems encountered heretofore.

Another object of the invention is to provide a process of manufacturing bottles bearing indicia which is more economical and simpler than those used heretofore.

Another object of the present invention is to simultaneously form, size and shape an object from semi-molten material and simultaneously therewith fix indicia on the surface of the object while it is being formed, sized and shaped, and before the object has solidified.

A further object of the invention is to manufacture a solidified bottle of a desired size and shape and with indicia fixed on the surface thereof by positioning a parison, capable of being formed into a desired size and shape and also capable of having indicia fixed to the surface thereof while the material is semi-molten, in a bottle-forming mold while the parison is semi-molten; thereafter expanding the parison to urge the semi-molten material thereof into contact with the mold and the indicia, to form and size the bottle and in addition simultaneously to fix the indicia to the surface of the formed bottle; and finally solidifying the formed bottle with the indicia thereon and removing the solidified bottle from the mold.

Numerous other objects and advantages of the invention will be apparent as it is better understood from the following description, which, taken in connection with the accompanying drawings, discloses a preferred embodiment thereof.

FIGURE 1 is a view, partly in cross section, illustrating mechanism carrying out the step of making a parison;

FIGURE 2 is an exploded view, with certain parts in cross section, to demonstarate the placing of a transfer with printed indicia against the inner surface of a bottle-forming mold and the placing of the parison in the mold;

FIGURE 3 is a cross-sectional view of a bottle forming mold and illustrates the step of the process wherein the parison is expanded against the forming and sizing surface of the mold and in addition simultaneously into contact with the transfer to fix the indicia on the bottle;

FIGURE 4 is a cross-sectional view of the mold, illustrating the removal of the bottle, with indicia thereon, from the mold and removal of the spent transfer from the surface of the mold;

FIGURE 5 is an enlarged fragmentary section taken along the line 5—5 of FIGURE 3, to illustrate the feature of the surface of the mold being recessed to receive the transfer so that the completed bottle, with indicia fixed thereon, has a surface, free of depressions or raised portions;

FIGURE 6 is a view similar to FIGURE 5 but showing a modification wherein a deeper recess is used so that the indicia will appear on a raised portion on the bottle;

FIGURE 7 is a view similar to FIGURE 5 but showing a modification wherein the transfer is on a raised portion of the surface of the mold so that the indicia will appear in a recessed surface portion of a completed bottle;

FIGURE 8 is an exploded view of an alternate form of the invention with certain parts in cross section, to demonstrate the placing of indicia, in the form of a label with printed matter, on the surface of the bottle-forming mold and the placing of the parison in the mold;

FIGURE 9 illustrates the step of the process following the step of FIGURE 8 and wherein the parison is expanded against the forming and sizing surface of the mold to form a bottle and in addition simultaneously, into contact with the label to fix the label on the bottle;

FIGURE 10 is a view illustrating the removal of the bottle with the label fixed thereon from the mold;

FIGURE 11 is an enlarged fragmentary view taken along line 11—11 of FIGURE 9, to illustrate how the bottle surface accommodates itself to the label so that the completed bottle has a smooth surface free of depression or raised portions;

FIGURE 12 is an exploded view with certain parts in cross section, to demonstrate the placing of a ring label adapted to encircle a bottle in the bottle-forming mold and the placing of the parison in the mold;

FIGURE 13 illustrates the step of the process wherein the parison is expanded against the forming and sizing surface of the mold and in addition thereto in contact with the ring label;

FIGURE 14 is a view illustrating the removal of the bottle, with ring label thereon, from the mold;

FIGURE 15 is a sectional view taken along the line 15—15 of FIGURE 14; and

FIGURE 16 is a fragmentary view illustrating another modification in which an indicia of irregular shape, for example, corrugated, may be used.

Definitions

Indicia as used herein includes any decoration, coating, film, label, or the like which is marriageable or bondable to, integrally interjoined with, or fixable on the material forming the object or bottle, and which is thereafter visible relative to the object or bottle so that it will visibly stand out on the surface thereof for indicative purposes.

Label as used herein means that specific form of indicia comprising a sheet of material having printing matter thereon and which is bonded or affixed to the material forming the object or bottle. A polyethylene sheet of material with decoration or printed matter on the surface thereof is an example of a label.

Transfer as used herein is a sheet of material which itself never becomes securely fixed to the object or bottle, but has indicia on the surface thereof capable of being transferred from the sheet and fixed to the material forming the object or bottle while the sheet is overlaid on a portion of the bottle-forming surface of the mold. An example of a transfer is a sheet of fluid absorbing material, such as newspaper which has ink on the surface thereof compatible with and fixable on the surface of the object being formed.

Fix, fixed and fixable are used herein to mean the permanent joining of the indicia, either with the surface of the object or that portion of the material next adjacent the surface of the object, in such manner that the indicia remains with the object throughout at least a major portion of its useful life.

The process of solidifying an object of a desired size and shape and with indicia on the surface thereof will be described with reference to the drawings which illustrate as a specific example an object in the form of a polyethylene bottle. It is well known in forming polyethylene bottles or containers that the material or polyethylene is formable into a desired size and shape and, for many commercial uses, it is also essential that the container have indicia transferred to and fixed on the surface thereof.

FIGURE 1 illustrates the formation of a parison by one form of apparatus used in the industry, and wherein polyethylene material 10 is heated to at least a predetermined elevated temperature at which the polyethylene is semi-molten and formable and is forced into a parison mold 11 to form a parison 12.

Also and in accordance with the invention, and as illustrated in FIGURE 2, a transfer 13 from a stack of transfers 14 is placed on the sizing and forming surface 15 of a bottle-forming mold 16. The transfer is held on the surface by any suitable means such as vacuum applied by pump P having a connection c leading through the mold wall, a suitable fugitive adhesive, static electricity, or by applying a moistening and air excluding agent such as water between the transfer 13 and surface 15 and pressing the former into place. The transfer 13 has indicia 17 on the surface thereof which will be engaged by and fixed to the polyethylene parison 12, the indicia 17 in this instance being a die pigment or ink in the form of the letters ACME in FIGURE 2. In one instance the transfer was a sheet of ordinary newsprint with the conventional inks designed for use with newsprint, both black and multicolor, being the indicia. One ink commonly used for newsprint comprises carbon black suspended in mineral oil of 50 centipoises viscosity.

Before the parison 12 has cooled below the predetermined elevated temperature and while it is still at that elevated temperature the parison is moved from the parison mold of FIGURE 2 and is inserted in the blow mold 16. FIGURE 2 shows the arrangement of the parison 12 relative to the mold 16 immediately prior to insertion of the parison in the mold and after the transfer 13 has been placed on the surface 15 of the mold. It is noted that the mold 16 in this instance comprises two portions 16A and 16B which are separated to receive the parison.

After the parison has been inserted in the mold 16 the mold halves 16A and 16B are brought together as illustrated in FIGURE 3. The parison 12 is supported by a parison support 18 during the time it is placed in the mold 16. This parison support 18 has tube 19 through which air, fluid, gas or the like under pressure is now forced into the inside of the parison 12 to expand the parison to thereby urge the material thereof into bottle-forming and sizing contact with the surface 15 and the transfer 13, in addition to urging the polyethylene into direct contact with the indicia on the transfer 13. During this operation the polyethylene parison 12 is still at the predetermined elevated temperature at which the polyethylene is semi-molten and formable.

The pressing or forcing of the polyethylene or material, while it is still semi-molten or formable and at the elevated temperature, against the sizing and forming surface forces the polyethylene to assume an external size and shape in accordance with the engaged surface 15 and the engaged surface of the transfer 13, thereby forming and sizing a bottle from the parison. In addition, and simultaneously with forming the parison into a bottle, the direct engagement and contact of the polyethylene with the indicia 17, while the polyethylene is at the elevated temperature, results in a removal of the indicia 17 from the transfer 13 and fixing the indicia to the polyethylene forming the bottle, now represented by the reference character 20 in FIGURE 3. In the instance wherein the transfer is a sheet of newsprint and the indicia is the ink thereon, the ink is transferred from the newsprint to the bottle.

As illustrated in the drawings, the bottle-forming mold is cooled by a suitable cooling means such, for example, cooling fluid in chamber 21 so that, as the next step in the process, the temperature of the polyethylene is lowered and reduced to thereby harden or solidify the polyethylene bottle. It is particularly noted that this reducing of the temperature and the consequent hardening or solidifying of the polyethylene is performed after the indicia has merged with, transferred to or become fixed on, the bottle and thus has become a part of the bottle. In the aforementioned instance wherein a sheet of newsprint was used as a transfer and the printed matter on the paper was transferred to the bottle, the pigment or carbon black in the ink became permanently fixed to the polyethylene bottle. The ink formed a sharp and clear decoration on the bottle in accordance with and the reverse of, the decoration appearing on the newsprint. Thus it appears that the newsprint, being somewhat absorbent in nature, prevented smearing of the decoration during the transfer of the ink to the bottle.

FIGURE 4 represents the final steps of the process wherein the solidified and completed bottle with the indicia thereon is removed from the mold and wherein the now spent transfer is also removed from the mold. This may be accomplished by reversing the action of the pump P, causing the transfer to be blown from the mold.

In FIGURE 5 there is illustrated in fragmentary enlarged detail the feature of providing the surface 15 with a recess 25 of a depth substantially equal to the thickness of the transfer 13 so that if the surface 15 is, for example, a cylindrical surface the finished surface of the bottle 20 will be cylindrical, smooth and free of depressions or projections. It will be understood, however, that even if the transfer 13 is placed directly on a smooth unrecessed surface, the impression of the backing would, for many purposes be insignificant.

In FIGURE 6 there is illustrated a modification of the structure of FIGURE 5. In this modification a recess 125, having a depth greater than the thickness of the transfer 13, is used in the surface 15. As illustrated, the finished bottle will therefore have a raised portion 20A on the surface thereof and on which the indicia appears.

In FIGURE 7 there is illustrated another modification of the structure of FIGURE 5. In this modification a raised portion 125A is formed in the surface 15 at the transfer receiving location. As illustrated the finished bottle will therefore have a recessed portion 20B on the surface thereof and on which the indicia appears.

The process of solidifying an object of a desired size and shape and with indicia in the form of a label fixed or bonded thereto will be described with reference to the FIGURES 8, 9, 10 and 11 which illustrate as a specific example an object in the form of a polyethylene bottle.

The label is preferably of a material similar to that used to make the bottle so that it will merge with or easily be fixed to the bottle in the form of the letters ACME in FIGURE 8. One of the labels 113 from a stack of labels 114 is placed on the sizing and forming surface 15 of the bottle-forming mold 16. The label 113 has printed matter on the surface thereof. A vacuum pump is desirably used as in the earlier described forms of the invention.

While the parison 12 is still at an elevated temperature as heretofore described, it is inserted in the mold 16. FIGURE 8 shows the arrangement of the parison 12 relative to the mold 16 immediately prior to insertion of the parison in the mold and after the label 113 has been placed on the surface 15 of the mold.

After the parison has been inserted in the mold (FIGURE 9), and before it has cooled or solidified, fluid under pressure is now forced into the inside of the parison 12 to expand the polyethylene parison to thereby urge the material of the parison into bottle-forming and sizing contact with the surface 15 and in addition to urge the polyethylene into direct contact with the label 113. During this operation the polyethylene parison 12 is still at the predetermined elevated temperature at which the polyethylene is semi-molten and formable.

The direct pressing or forcing of the polyethylene or material, while it is still semi-molten or formable and at the elevated temperature, against the sizing and forming surface forces the polyethylene to assume an external size and shape in accordance with the engaged surface 15 thereby forming and sizing a bottle from the parison 12 and label 113. The direct engagement and contact of the polyethylene with the label 113, while the polyethylene is at the elevated temperature, results in a merging with or fixing of the label 113 to the polyethylene forming the bottle, now represented by the reference character 120 in FIGURE 10.

In particular it has been discovered that a branched polyethylene label with the indicia preformed thereon can be effectively adhered to the bottle in a firm and reliable manner without any agent other than the heat and pressure of the bottle-blowing environment, if the thickness of the sheet is .005 inch or less.

Thereafter the temperature of the polyethylene is lowered and reduced to thereby harden or solidify the polyethylene bottle. It is particularly noted that this reducing of the temperature and the consequent hardening or solidifying of the polyethylene is performed after the label has merged with or transferred to the bottle or has otherwise become affixed to and a part of the polyethylene and a part of the bottle, all of which took place simultaneously with the forming of the bottle from a parison. FIGURE 10 represents the final steps of the process wherein the completed bottle with the label fixed thereon is removed from the mold.

FIGURE 11 illustrates, in fragmentary enlarged detail, the structure of the bottle in cross section the label imbedded in the polyethylene of the bottle and fixed thereto.

As illustrated, the finished bottle will therefore have a surface conforming with the size and shape of the surface 15 of the mold surface and on which the indicia or printed matter on the label appears.

FIGURES 12 to 15 are directed to a modification wherein a ring label is used in lieu of a label as illustrated in FIGURE 8. In this modification one of the ring labels 213 is placed on the sizing and forming surface 15 of a bottle-forming mold 16. The ring label 213 has indicia 17 on the outer surface and, in this instance also has a button 213a depressible into a button hole 215 in the surface 15 of the mold 16. The button 213a holds the ring label in position relative to the mold 16 during the placing of the parison in the mold. FIGURE 12 shows the mold supporting the ring label 213 in position and ready to receive the parison 12.

While the parison is still at moldable temperature the same is inserted in the mold 16.

After the parison has been inserted in the mold (FIGURE 13), and before it has cooled or solidified, fluid under pressure is now forced into the inside of the parison 12 to expand the polyethylene parison to thereby urge the material of the parison into bottle-forming and sizing contact with the surface 15 in addition to urging the polyethylene into direct contact with the ring label 213. During this operation the polyethylene parison 12 is still at the predetermined elevated temperature at which the polyethylene is semi-molten and formable.

Thereafter the temperature of the polyethylene is lowered and reduced to thereby harden or solidfy the polyethylene bottle. It is particularly noted that this reducing of the temperature and the consequent hardening or solidifying of the polyethylene is performed after the ring label 213 has merged with or has otherwise become affixed to and a part of the polyethylene bottle, and in any event is mechanically locked to the bottle whether adhered or not.

FIGURE 14 represents the final step of the process wherein the completed bottle with the ring label thereon is removed from the mold.

FIGURE 15 illustrates in cross section the structure of a completed bottle encompassed by a ring label 213 and formed in accordance with the process of FIGURES 12 to 14 inclusive.

While the arrangement shown in FIGURES 12 to 14 embodies a mechanical connection for supporting the ring label 213 in the mold, it will be understood that vacuum or magnetic arrangements can also be made use of in this connection if desired, as explained earlier.

In FIGURE 16 is illustrated a form of the invention wherein the area of the mold surface 15 to which the label will be attached is recticularly grooved, waffled or otherwise roughened, rather than being smooth as shown in the previous forms. It has been discovered that when a plastic label, for example, one made from branched polyethylene, is caused to deform and accommodate itself to rather sharp deviations in the mold shape by the pressure of the expanding parison thereagainst, certain forces are set up which result in the label adhering successfully to the surface of the plastic container under the heat and pressure of blowing the parison to bottle form, even in cases where the label would not otherwise adhere by itself to the bottle. For example, even when the polyethylene label thickness exceeds the .005 inch heretofore described as the maximum for securing suitable self-adherence, the label can be made to bond firmly to the bottle exterior by applying this principle of giving the mold surface the above described recticularly grooved form within the label area with excellent results so far as adherence of the label is concerned.

Various changes and modifications, other than those specifically described and illustrated herein, can of course be effected without departing from the novel concepts of this invention.

I claim:

1. The process of manufacturing a plastic bottle of a desired size and shape and with a label on the surface thereof, comprising the steps of providing a bottle-forming mold having a portion of its sizing surface coarsely roughened, overlaying a label with indicia on one side thereof on said coarsely roughened portion of said sizing surface with said indicia against said surface, positioning a semi-molten parison in said mold, inflating said parison to thereby urge said parison and the combination of said label and said sizing surface into bottle-forming and sizing contact to thereby form and size the bottle from the parison and in addition simultaneously to fix the label to the surface of the formed bottle, solidifying the formed and sized bottle, and removing the solidified bottle with the label thereon from the mold.

2. The process of manufacturing a polyethylene bottle of a desired size and shape and with a label on the surface thereof, comprising the steps of providing a bottle-forming mold having a portion of its sizing surface coarsely roughened, overlaying a polyethylene label with indicia on one side thereof on said coarsely roughened portion of the sizing surface of the bottle-forming mold with said indicia against said surface, positioning a semi-molten injection molded polyethylene parison in said mold, inflating said parison to thereby urge said parison and the combination of said label and said sizing surface into bottle forming and sizing contact to thereby form and size the bottle from the parison and in addition simultaneously to fix the label to the surface of the formed bottle, solidifying the formed and sized bottle, and removing the solidified bottle with the label thereon from the mold.

3. The process of manufacturing a plastic bottle of a desired size and shape and with a label on the surface thereof, comprising the steps of providing a bottle-forming mold having a portion of its sizing surface coarsely roughened, overlaying a label on said coarsely roughened portion of said sizing surface, positioning a semi-molten parison in said mold, inflating said parison to thereby urge said parison and the combination of said label and said sizing surface into bottle-forming and sizing contact to thereby form and size the bottle from the parison and in addition simultaneously to fix the label to the surface of the formed bottle, solidifying the formed and sized bottle, and removing the solidified bottle with the label thereon from the mold.

References Cited by the Examiner

UNITED STATES PATENTS

| | | | |
|---|---|---|---|
| 1,744,438 | 1/30 | Bensen | 18—61 |
| 2,331,702 | 10/43 | Kopitke | 18—55 |
| 2,632,202 | 3/53 | Haines | 18—55 XR |
| 2,959,812 | 11/60 | Allen | 18—5 |
| 3,072,969 | 1/63 | Du Bois | 18—55 |
| 3,074,112 | 1/63 | Bobrow | 264—275 |

ROBERT F. WHITE, *Primary Examiner.*

MORRIS LIEBMAN, *Examiner.*